United States Patent Office 3,549,613
Patented Dec. 22, 1970

---

3,549,613
WATER-INSOLUBLE PHENYL-AZO-PHENYL DYESTUFFS
Helmut Lindner and Ernst Hoyer, Frankfurt am Main, and Heinz Schmidt, Kelkheim, Taunus, Germany, assignors to Farbwerke Hoechst Aktiengesellschaft vormals Meister Lucius & Bruning, Frankfurt am Main, Germany, a corporation of Germany
No Drawing. Filed Oct. 29, 1968, Ser. No. 771,609
Claims priority, application Germany, Nov. 4, 1967, 1,644,232
Int. Cl. C07c *107/06;* C09b *29/24*
U.S. Cl. 260—207         5 Claims

ABSTRACT OF THE DISCLOSURE

Water-insoluble monoazo-dyestuffs of the formula

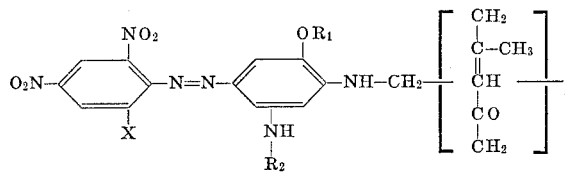

in which X represents hydrogen, chlorine or bromine, $R_1$ represents lower alkyl, and $R_2$ represents lower acyl, said dyestuffs being highly suitable for the dyeing of fibrous materials of cellulose-2½-acetate, cellulose-triacetate, polyamide, polyurethane or polyesters.

---

The present invention relates to new water-insoluble monoazo dyestuffs of the General Formula 1

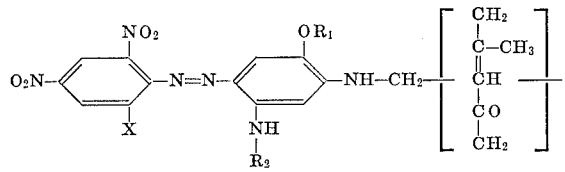

wherein X represents a hydrogen, chloroine or bromine atom, R represents an alkyl group of lower molecular weight and $R_2$ stands for an alkylcarbonyl radical of lower molecular weight, and to a process for their preparation which comprises diazotizing aromatic amines of the General Formula 2

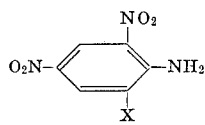

wherein X is defined as above and combining said amines with coupling components having the General Formula 3

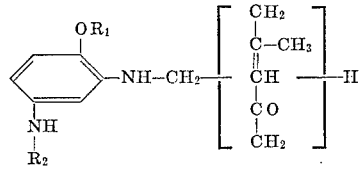

in which $R_1$ and $R_2$ are defined as above.

The coupling components which are used in the instant process corresponding to the said Formula 3 may, for example, be prepared by reacting amines of the General Formula 4

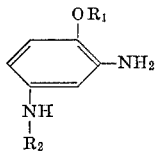

wherein $R_1$ and $R_2$ are defined as above, with Mannich bases obtainable from 2-methyl-pentanol-(2)-one-(4), formaldehyde and a dialkylamine, for example diethylamine, whenever the reaction is conducted in such a manner that one molecule of water is split off in the course of the reaction from the 2-methyl-pentanol-(2)-one-(4) radical.

The coupling is normally carried out in an acidic to neutral medium to which acid-binding agents, for example sodium bicarbonate, sodium acetate, magnesium carbonate or sodium hydroxide solution may be advantageously added. The dyestuffs which are obtained in a water-insoluble form, are, for example, isolated by suction filtration and washed with water until free from the adhering electrolytes.

The new water-insoluble monoazo dyestuffs resulting from the instant process are processed by known methods with addition of dispersing agents into dyeing compositions.

These preparations yield at a very good ratio of dyestuff concentration employed to tinctorial strength obtained on synthetic fibres such, for example, as fibres of cellulose triacetate, cellulose-2½-acetate, polyamide or polyurethane, in particular, however, polyester fibres, for example, polyethyleneglycol terephthalate, dyeings and prints which, beside a high tinctorial strength, possess a good processing and application fastness, especially to light, wet processing and action of heat, for example thermofixation or rubbing. The dyestuffs of the invention have, moreover, the advantage that they do not leave on the dyed material any bronzy deposits, even if very deep dyeings are produced.

For dyeing polyester materials the new dyestuffs are conveniently used in the form of the above-mentioned compositions, for example, as powders or granules or liquid preparations capable of being poured. They are applied from an aqueous bath at temperatures above 100° C., either at a pressure or at about 100° C. in the presence of known carriers. Another method leading to intense shades consists in impregnating fabrics or knit fabrics made from polyester materials with suspensions of said dyestuffs, drying and subsequently exposing to a short heat treatment, for example at a temperature of 190° C. to 210° C. Furthermore, the dyestuffs are highly appropriate for the dyeing of blends of fibres containing a portion of polyesters. In dyeing blends of polyesters and wool the wool portion is only faintly colored, so that the wool coloration can be easily removed by additional treatment with reducing agents or emulsifiers.

The following examples illustrate the invention, the parts and percentages being by weight unless otherwise stated.

EXAMPLE 1

217.5 parts of 6-chloro-2,4-dinitroaniline were introduced into a mixture consisting of 500 parts of sulfuric acid of 95.5% strength and 324 parts of nitrosyl-sulfuric acid of 40% strength and the whole was stirred for 2 hours at about 30° C. The so-obtained solution was added for about one hour to a solution of 304 parts of a coupling component of the formula

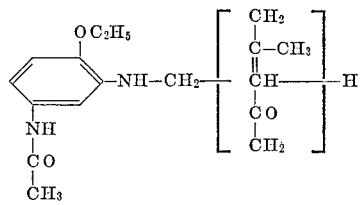

in 3000 parts of water that had been weakly acidified with a small amount of concentrated hydrochloric acid and containing in addition 2000 parts of ice. The coupling temperature was to range between —3° C. and +5° C. After the addition the whole was stirred for another 4 hours, allowing the temperature to rise, whereupon the dark blue dyestuff that precipitated was suction-filtered, washed with water until free from electrolytes and until neutral reaction occurred and dried. 500 parts of a dyestuff of the formula

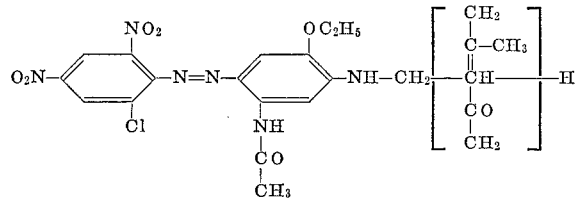

were obtained which in a finely divided form dyed polyester fibres marine blue shades not subliming and fast to light.

A very similar dyestuff was obtained when instead of 6-chloro-2,4-dinitroaniline 263 parts of 6-bromo-2,4-dinitroaniline were used.

EXAMPLE 2

217.5 parts of 6-chloro-2,4-dinitroaniline were introduced into a mixture of 500 parts of sulfuric acid of 95.5% strength and 324 parts of nitrosyl-sulfuric acid of 40% strength and stirred for 2 hours at about 30° C. The resulting solution was poured into a solution of 290 parts of a coupling component of the formula

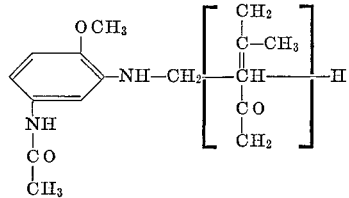

in 3200 parts of water weakly acidified with a small amount of concentrated hydrochloric acid to which solution about 2000 parts of ice had been added, whereat the temperature was to range between —3° and +5° C. The whole was stirred uncooled for another 3 to 4 hours, then the dyestuff was isolated by suction-filtration, washed with water to neutral and until it was free from electrolytes and finally dried. About 480 parts of the dyestuff of the formula

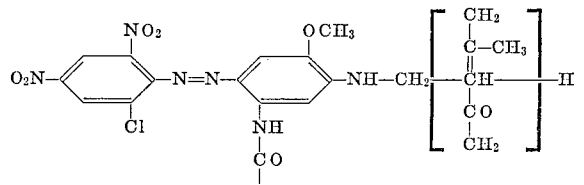

were obtained which in a finely divided form dyed polyester fibres marine blue shades that did not sublime and were fast to light.

A dyestuff of very similar dyeing properties was obtained, when in the place of 6-chloro-2,4-dinitroaniline 263 parts of 6-bromo-2,4-dinitroaniline were used.

EXAMPLE 3

18.3 parts of 2,4-dinitroaniline were introduced in known manner into a mixture of sulfuric acid and nitrosylsulfuric acid. The obtained solution was poured while simultaneously 300 parts of ice were added at —3° to +5° C., in a hydrochloric acid solution of 30.4 parts of a coupling component of the formula

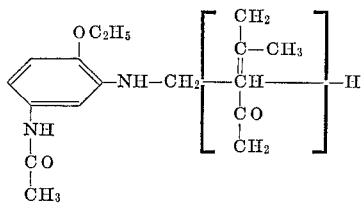

in 300 parts of water. After approximately two hours the dyestuff was isolated by suction-filtration, washed with water and dried. About 42 parts of the dyestuff of the formula

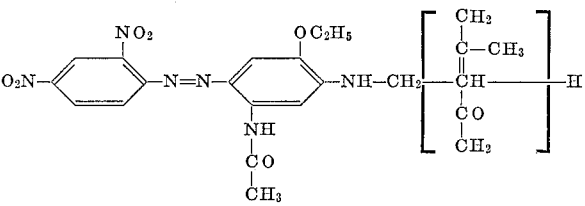

were obtained which in a finely divided form dyed polyester fibres violet shades not subliming and fast to light.

A similar dyestuff was obtained when a solution of 29 parts of a coupling component was used that in the place of an acetoamino group carried a formamino group.

We claim:
1. A water-insoluble monoazo-dyestuff of the formula

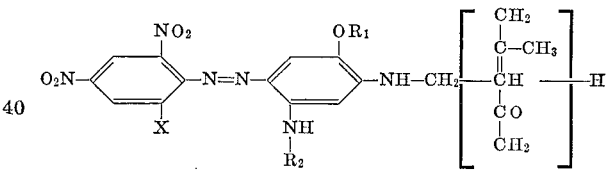

in which X represents hydrogen, chlorine or bromine, $R_1$ represents lower alkyl, and $R_2$ represents alkylcarbonyl.

2. The water-insoluble monoazo-dyestuff of the formula

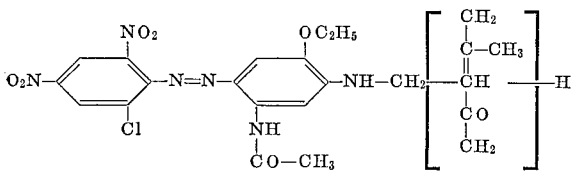

3. The water insoluble monoazo-dyestuff of the formula

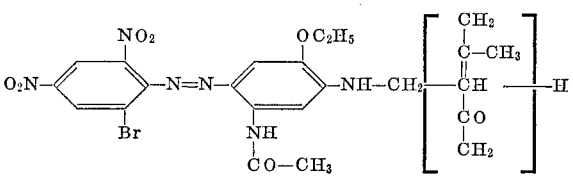

4. The water-insoluble monoazo-dyestuff of the formula

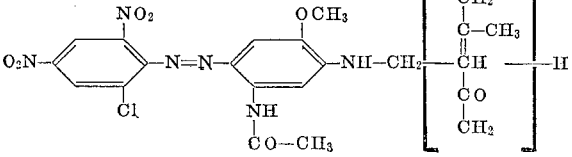

5. The water-insoluble monoazo-dyestuff of the formula
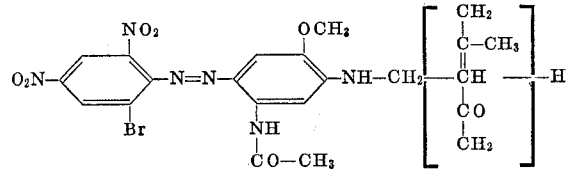
References Cited
UNITED STATES PATENTS
2,469,682  5/1949  Dickey _____ 260—207(X)
3,284,437  11/1966  Gies et al. _____ 260—207
CHARLES B. PARKER, Primary Examiner
C. F. WARREN, Assistant Examiner
U.S. Cl. X.R.
8—41, 50, 26; 260—562